United States Patent [19]
Pierce et al.

[11] Patent Number: 5,372,059
[45] Date of Patent: Dec. 13, 1994

[54] FLUID OPERATED BRAKE ACTUATOR WITH INTERNAL VALVE

[75] Inventors: William C. Pierce, Muskegon; John P. Bowyer, Whitehall, both of Mich.

[73] Assignee: NAI Anchorlok Inc., Muskegon, Mich.

[21] Appl. No.: 54,757

[22] Filed: Apr. 27, 1993

[51] Int. Cl.$^5$ .............................................. F01B 19/00
[52] U.S. Cl. ........................................... 92/48; 92/96; 91/509; 91/376 R
[58] Field of Search .............. 91/376 R, 369.1, 509, 91/533, 170 R; 92/48, 49, 96, 98 R, 99, 100; 60/547.1

[56] References Cited

U.S. PATENT DOCUMENTS

| | | |
|---|---|---|
| 2,931,616 | 4/1960 | White et al. ............................. 92/49 |
| 3,101,219 | 8/1963 | Herrera ................................... 92/48 |
| 3,155,012 | 11/1964 | Ayers ..................................... 92/49 |
| 3,659,501 | 5/1972 | Beard ..................................... 92/49 |
| 3,696,711 | 10/1972 | Berg et al. .............................. 92/48 |
| 3,712,178 | 1/1973 | Hensley . |
| 3,730,056 | 5/1973 | Swander, Jr. ........................... 92/48 |
| 4,960,036 | 10/1990 | Gummer et al. . |

FOREIGN PATENT DOCUMENTS

| | | |
|---|---|---|
| 531795 | 10/1956 | Canada ................................... 92/49 |
| 513774 | 2/1955 | Italy ....................................... 92/49 |
| 0007809 | 1/1978 | Japan ..................................... 92/49 |

OTHER PUBLICATIONS

Brochure Entitled *Neway Immediate Response Height Control Valve*, 1 sheet, 2-sided, dated 1992. The brochure was published by Lear Siegler Truck Products Corporation.

*Primary Examiner*—Edward K. Look
*Assistant Examiner*—Hoang Nguyen
*Attorney, Agent, or Firm*—Varnum, Riddering, Schmidt & Howlett

[57] ABSTRACT

A fluid-operated brake actuator having a hollow actuator rod between a spring chamber of a spring brake housing and a spring chamber of a service brake housing incorporates a valve within the actuator rod. The valve isolates the two spring chambers from each other in normal operation and releases a vacuum in the spring brake housing spring chamber when the spring brake is activated. A separate one-way check valve mounted in a well of the spring brake housing permits fluid to exhaust from the spring chamber to atmosphere and prevents contaminants in the atmosphere from entering the spring chamber.

17 Claims, 10 Drawing Sheets

FLUID OPERATED BRAKE ACTUATOR WITH INTERNAL VALVE

BACKGROUND OF THE INVENTION

1. Field of the Invention

The invention relates to fluid-operated brake actuators for vehicles and more particularly to service and spring brake actuators combined in tandem and having a spring brake actuator rod.

2. State of the Prior Art

An air brake system for a vehicle such as a bus, truck or the like typically includes a brake shoe and drum assembly which is actuated by means of an actuator assembly operated by the selective application of a fluid such as compressed air. Conventional air brake actuators have both a service brake actuator for actuating the brakes under normal driving conditions by the application of compressed air and an emergency or spring brake actuator which causes actuation of the brakes when air pressure has been released. The emergency brake actuator includes a strong compression spring which forces application of the brake when air is released. This is often referred to as the spring brake. Typically, the spring brake actuator is disposed in tandem with the service brake actuator.

The spring brake actuator is typically divided into two chambers separated by a rubber diaphragm and pressure plate, with the spring in one of the chambers acting between and end wall of the spring brake housing and the pressure plate. When full pressure is applied to the opposite chamber, air pressure acting against the diaphragm and pressure plate compresses the spring. In many applications, a spring brake actuator rod is held in a retracted position by a relatively small return spring. In newer applications, the spring brake actuator rod is integral with the pressure plate and held in a retracted position by the air pressure.

In both designs, the spring brake actuator rod thus does not affect the normal operation of the brake. The service chamber is typically divided into two chambers by a diaphragm. Depressing the brake pedal during normal driving operation introduces compressed air into one of the chambers of the service brake actuator which, acting against the diaphragm, causes a service brake push rod in the opposite chamber to be extended and the brakes to be applied with an application force proportional to the air pressure in the service brake actuator.

In the event of a loss of air pressure or an intentional exhaustion of air from the spring brake actuator, the brake will be mechanically activated by the force of the strong compression spring acting on the spring brake actuator rod which, in turn, acts upon the service brake push rod to apply the brakes. Thus, the spring brake portion serves both as a parking brake and an emergency brake.

In tandem actuator assemblies, the spring brake push rod typically extends from a chamber in the spring brake portion, through an aperture in a wall separating the spring brake actuator from the service brake actuator, and into a chamber in the service brake portion. Because at least one of the adjoining chambers is usually pressurized, a seal is provided at the aperture around the push rod comprising one or more O-rings positioned in annular channels in the wall around the aperture.

When pressure is released from the spring brake actuator, the spring and diaphragm extend significantly, expanding the volume of the spring brake actuator chamber containing the spring. Means must be provided for allowing air to enter the expanded volume of the chamber. Conversely, when the spring is retracted, and the volume of the chamber contracts, means must be provided for evacuating air from the chamber. In many prior brake actuators, the chamber containing the spring is simply open to atmosphere through ports in the chamber housing. However, this allows dirt, salt, moisture and other unwanted material to enter that chamber through the ports. With the advent of hollow actuator rods containing caging tools, the presence of foreign material within the actuator rod has become an increasing concern of brake designers.

Some prior designs have attempted to address this problem by providing a breather tube between the push rod chamber of the service brake actuator and the spring chamber of the spring brake actuator, as in the U.S. Pat. No. 4,960,036 to Gummer et al. In this design, the push rod chamber of the service brake actuator must be vented to atmosphere for normal application of the brakes. Venting of the push rod chamber occurs either through a separate vent, or through the external opening carrying the push rod. Thus, the spring chamber of the spring brake actuator remains open to atmosphere, and is still exposed to moisture, dirt and grime, albeit through a longer passage than a fully vented spring chamber. This longer passage may also prevent the spring chamber from drying as effectively as a sealed or more fully vented spring chamber.

SUMMARY OF THE INVENTION

The brake actuator of the present invention overcomes these limitations.

A brake actuator for a vehicle comprises a service brake housing and a tandem spring brake housing. A first moveable member, disposed within the service brake housing, divides the interior thereof into a first service brake chamber and a second service brake chamber. The member is reciprocally moveable therein in response to the delivery and exhaust of pressurized fluid to the first service brake chamber. A brake actuator push rod extends from the second service brake chamber and operably connects to the first moveable member for actuation of a brake. A second moveable member, disposed within the spring brake housing, divides the interior thereof into a first spring brake chamber and a second spring brake chamber. The second member is reciprocally moveable therein in response to the delivery and exhaust of pressurized fluid to the second spring brake chamber. The spring brake housing has an aperture establishing communication between the first spring brake chamber and atmosphere. A power spring, disposed in the first spring brake chamber, moves the second moveable member upon exhaust of fluid from the second spring brake chamber. A hollow actuator rod has a proximal end mounted to and extending through the second movable member for reciprocal movement with the second moveable member between an extended position and a retracted position. A distal end of the actuator rod is disposed within the first service brake chamber in a position to move the first moveable member when the second moveable member moves.

In accordance with the invention, a one-way valve is mounted to the spring brake housing at the aperture so that fluid flow from atmosphere to the first spring brake chamber is restricted. The actuator rod is open at its proximal and distal ends so that the first spring brake chamber is in fluid communication with the first service brake chamber through the actuator rod. A control valve mounts within the actuator rod and has an open mode where the first spring brake chamber is in open communication with the first service brake chamber. In a closed mode of the control valve, the first spring brake chamber is not in communication with the first service brake chamber. Closing means places the control valve in the closed mode when the actuator rod is in the retracted position. Fluid is delivered to the first spring brake chamber from the first service brake chamber upon movement of the actuator rod to the extended position and the first spring brake chamber is isolated from the introduction of fluid from atmosphere.

Preferably, the one-way valve comprises a plug having a shaft disposed within the aperture, and a head on the shaft larger than the aperture and exterior of the spring brake housing. Biasing means biases the head into sealing abutment with the exterior surface of the spring brake housing at a predetermined force, whereby when fluid pressure within the first spring brake chamber exceeds the predetermined force, the head of the plug will move away from the exterior surface and fluid will escape through the aperture to atmosphere. The biasing means preferably comprises at least one flexible projection, extending from the shaft at a point within the first spring brake chamber into abutment with the interior surface of the spring brake housing. The flexible projection is deformed so that the deformation of the projection tends to urge the head of the plug into sealing abutment with the spring housing. Preferably, the predetermined force is one to two pounds per square inch of gauge pressure. An annular ring on the head contacts the spring brake housing to form the seal.

Preferably, the control valve is mounted within the distal end of the actuator rod. A caging tool extends into the actuator rod through its proximal end, and the closing means comprises a valve pin on the end of the caging tool adapted to push against a portion of the control valve when the actuator rod is in the retracted position.

The control valve preferably comprises a tubular body disposed within the distal end of the actuator rod. A piston chamber within the body has an open first end and an open second end. A main piston is disposed within the piston chamber for reciprocal movement therein. The main piston has an open position where the first end of the piston chamber communicates with the second end of the piston chamber, and a closed position where the piston blocks communication between the first end of the piston chamber and the second end of the piston chamber. The open and closed positions correspond to the open and closed modes of the valve, respectively.

A spring biases the main piston toward its open position. The main piston has a coaxial interior bore with an open distal end and a closed proximal end. The distal end is oriented toward the first end of the piston chamber. At least one radial passageway extends from the interior bore radially outwardly through the main piston body to an exit opening. The exit opening is outside of the piston chamber in the open position, and inside of the piston chamber in the closed position. The valve pin extends into the piston chamber through its second end and holds the main piston in its closed position when the actuator rod is in the retracted position. The piston chamber first end communicates with the piston chamber second end through the piston interior bore and the radial passageway. This communication only occurs when the open control valve is in the open position.

An overpressure stop valve can be provided. The stop valve comprises a pressure plate moveable within the main piston second chamber between an open position and a restricted position. A pressure plate biasing means biases the pressure plate toward the open position. The pressure plate abuts a sealing lip in the interior chamber to restrict flow through the interior chamber in the restricted position. The pressure plate is away from the sealing lip in the open position.

Preferably, the pressure plate comprises a float piston, the biasing means comprises a spring between the float piston and the closed end of the interior chamber, and the sealing lip comprises an annular shoulder on the inside surface of the interior chamber. The float piston can be provided with a small restricted flow aperture therethrough.

Alternatively, the pressure plate comprises a spring metal diaphragm having a flow aperture therethrough. The sealing lip comprises an annular lip on an end of a coaxial stanchion within the interior chamber. The biasing means comprises the diaphragm having a resting shape wherein the diaphragm flow aperture is away from the annular lip. The diaphragm also has a deformed shape under a predetermined pressure gradient across the diaphragm wherein the diaphragm contacts the annular lip and the diaphragm flow aperture is restricted by the stanchion.

Preferably, the actuator rod has an exterior face at its distal end having at least one groove extending radially outwardly from the opening at the actuator rod distal end to a radial edge thereof. The first service brake chamber has an air port adapted to be connected to a source of pressurized air. A channel in the service brake housing leads from the air port to the groove, so that the opening at the distal end of the actuator rod remains in communication with the air port if the first moveable member is in contact with portions of the spring brake housing between the opening at the distal end of the actuator rod and the air port.

DETAILED DESCRIPTION OF THE DRAWINGS

Figure 1:
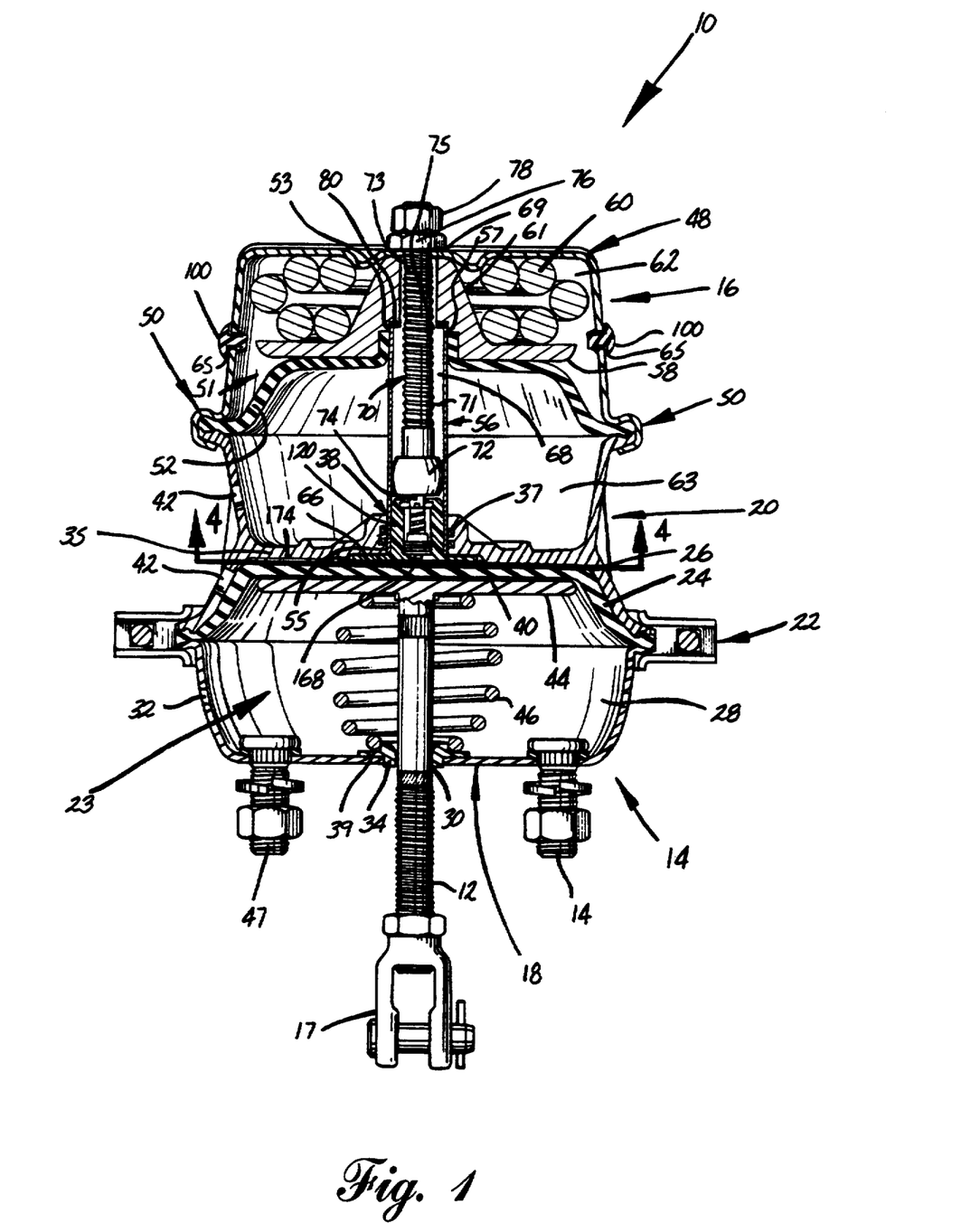
FIG. 1 is a cross-sectional view of an air-operated brake actuator with vents and control valve of an isolation system according to the invention.

FIG. 1 illustrates a fluid-operated brake actuator 10 having a general configuration well known in the art. The fluid-operated brake actuator 10 comprises a service brake actuator 14 mounted in tandem to a spring chamber or emergency brake actuator 16. A service brake push rod 12 extends from the service brake actuator 14 for reciprocating movement between a retracted position and an extended actuating position relative to the service brake actuator 14, and is provided with a clevis 17 which is adapted to connect to a conventional brake shoe and drum (not shown) in a standard fashion. Reciprocating motion of the service brake push rod 12 will cause the brake to be alternately applied and released.

The service brake actuator 14 comprises a cup-shaped service housing section 18 and a double cup-shaped adapter housing 20 joined together by a clamp 22 to form a service brake chamber 23. The adapter housing 20 is also sometimes known as a flange case.

A first elastomeric diaphragm 24 (also known as the service brake diaphragm) is suspended within the service brake chamber 23, the peripheral edge thereof secured in fluid tight enclosure between the cup-shaped service housing section 18 and the service side of the adapter housing 20 by the clamp 22. The first elastomeric diaphragm 24 thus separates the service brake chamber 23 into two portions: a first service chamber portion 26 and a second service chamber portion 28. The first service chamber portion 26 communicates with a source of pressurized air (not shown) through an air service port 42 in the adapter housing 20. The second service chamber portion 28 is vented to the atmosphere through at least one opening 32 in the cup-shaped service housing section 18. In FIG. 1, the first service chamber portion 26 is shown evacuated so that the first elastomeric diaphragm 24 is forced against the adapter housing 20 because of the force from spring 46 in the second service chamber portion 28.

The service brake push rod 12 extends through a central opening 30 in the cup-shaped service housing section 18 and has a pressure plate 44 at the end thereof within the second service chamber portion 28. The pressure plate 44 bears against the first elastomeric diaphragm 24. A compression spring 46 extends between the pressure plate 44 and the interior surface of the cup-shaped service housing section 18. A push rod guide 34 having an annular seat 39 is disposed within the central opening 30 to guide reciprocal movement of the service brake push rod 12 within the central opening 30 and also to receive the end of the compression spring 46 and retain it in position around the central opening 30. The compression spring 46 thus urges the pressure plate 44 and the service brake push rod 12 to a fully retracted position as depicted in FIG. 1.

To operate the service brake, compressed air is introduced through the air service port 42 into the first service chamber portion 26 to create a force against the first elastomeric diaphragm 24 and pressure plate 44 sufficient to overcome the force of the compression spring 46, thereby extending the service brake push rod 12 toward the actuating position. The openings 32 permit rapid evacuation of air from the lower service chamber section 23 as the service brake is actuated. Mounting studs 47 are provided to mount the fluid-operated brake actuator 10 onto a vehicle (not shown).

The spring chamber or emergency brake actuator 16 is defined by the spring side of the adapter housing 20 and a generally cylindrical head 48 or spring chamber, which is clamped to the spring side of the adapter housing 20 by a clamp 50 to form the spring brake chamber 51. A second elastomeric diaphragm 52, known as the spring diaphragm, is suspended within the spring brake chamber 51, the peripheral edge thereof secured in fluid tight enclosure between the cylindrical head 48 and the spring side of the adapter housing 20 by the clamp 50. The second elastomeric diaphragm 52 thus separates the spring brake chamber 51 into two portions: a first spring chamber portion 62 and a second spring chamber portion 63. The second spring chamber portion 63 is filled with pressurized air supplied through an air service port 54 in the adapter housing 20 when the emergency brake is in its normal released position as depicted in FIG. 1.

The adapter housing 20 includes a divider wall 35 which separates the adjoining service brake chamber 23 and spring brake chamber 51. A spring brake actuator rod 56, aligned with the service brake push rod 12, has one end extending from the spring brake chamber 51 through a central opening 38 in divider wall 35 for reciprocating motion through the central opening 38 between a retracted position and an actuating position. One or more O-ring seals 37 are provided in the central opening 38 through which the spring brake actuator rod 56 reciprocates.

A distal end 55 of the spring brake actuator rod 56 terminates in a reaction plate 66 in the first service chamber portion 26, and which is received in an annular seat 40 when the spring brake actuator rod 56 is in the retracted position as depicted in FIG. 1. An opposite, proximal end 57 of the actuator rod 56 extends through an opening 53 in the second elastomeric diaphragm 52 and terminates in a pressure plate 58 which abuts an end of a large force compression spring 60. The pressure plate 58 abuts one end of the compression spring 60. A tubular portion 61 of the pressure plate 58 extends generally axially along the axis of the compression spring 60. The tubular portion 61 of pressure plate 58 is press-fit into the proximal end 57 of the spring brake actuator rod 56 such that the pressure plate 58 and the spring brake actuator rod 56 form an integral unit with the second elastomeric diaphragm 52 secured therebetween.

During normal operation of the fluid-operated brake actuator 10, the spring brake actuator rod 56 will be in the fully retracted position, as depicted in FIG. 1, by means of compressed air which is maintained in the second spring chamber portion 63. When the compressed air is exhausted from the second spring chamber portion 63, the compression spring 60, one end of which abuts the outer end wall of the cylindrical head 48, forces the integral pressure plate 58 and spring brake actuator rod 56 in the direction of the service brake push rod 12. The force of the compression spring 60 causes the spring brake actuator rod 56 to be extended through the central opening 38, thereby causing the reaction plate 66 to apply a force to the first elastomeric diaphragm 24 and pressure plate 44 of the brake actuator 14. This action causes the service brake push rod 12 to be extended toward the actuating position, thereby applying the brake (not shown). When the spring brake actuator 16 is to be released, compressed air is once again introduced into the second spring chamber portion 63 to a pressure sufficient to overcome the force of the compression spring 60. The force of the compressed air against the second elastomeric diaphragm 52 causes the pressure plate 58, the spring brake actuator rod 56 and the compression spring 60 to be returned to the position depicted in FIG. 1.

In the embodiment shown, the spring brake actuator rod 56 is a hollow tube or rod provided with a central bore 68 to accommodate a brake release rod or caging tool 70. The central bore 68 of the spring brake actuator rod 56 receives the caging tool 70, which passes through aligned apertures 69, 73, and 75 in the cylindrical head 48, pressure plate 58 and spring brake actuator rod 56, respectively. The caging tool 70 comprises a threaded elongated shaft 71, with one end having an enlarged head portion 72, which terminates in a valve pin 74. The opposite end of the caging tool 70 is threaded through a head nut 76 fixedly mounted to the cylindrical head 48, and has a hex head nut 78 fixedly secured thereto.

The caging tool 70 primarily serves to enable manual retraction of the powerful compression spring 60. Rotation of the hex head nut 78, threads the shaft 71 through the head nut 76, to axially move the caging tool 70 with respect to the cylindrical head 48. The head portion 72 slides freely within the bore 68 of the actuator rod 56, yet is restrained by an inwardly directed annular flange 80 at the actuator rod proximal end 57. Thus, withdrawal of the caging tool 70 by rotation of the hex head nut 78, causes the head portion 72 to abut the flange 80, and retract the pressure plate 58 and spring 60. For safety, the spring 60 is typically retracted during repairs to the brake actuator 10 and during shipping.

The cylindrical head 48 includes one or more ports 65 therein which establish communication between the first spring chamber portion 62 and the atmosphere. A one-way vent 100, installed in each port 65, controls the flow of air through the port.

Figure 2:
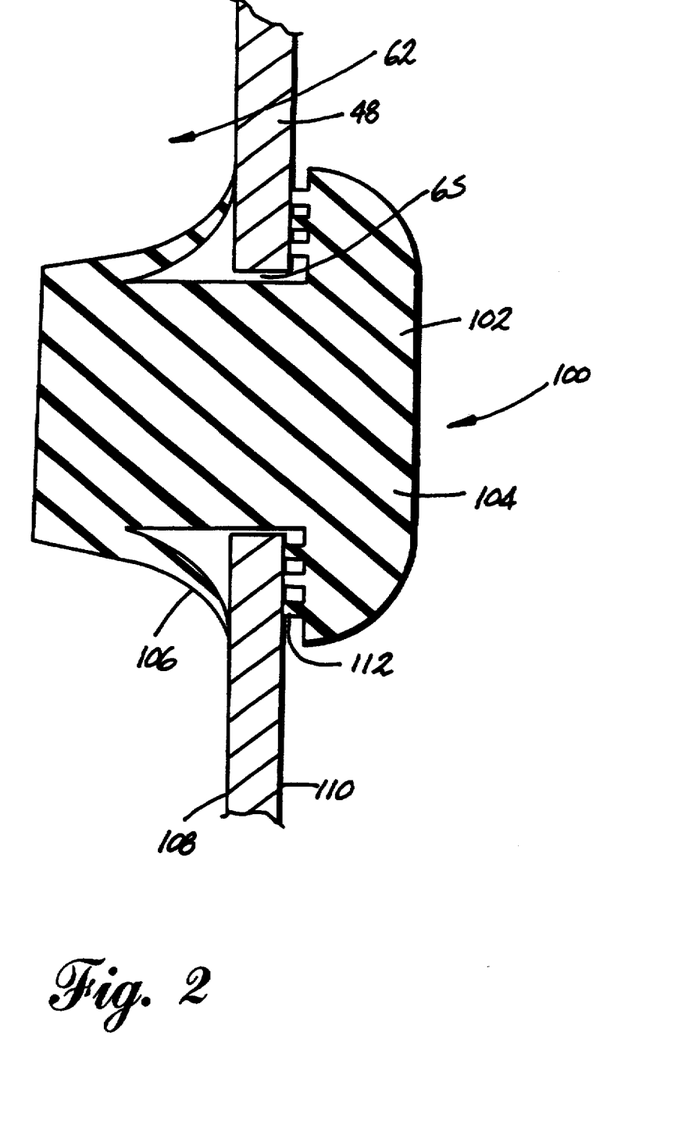
FIG. 2 is an enlarged fragmentary cross sectional view of the vents of FIG. 1.

Turning now to FIG. 2, it can be seen that the vent 100 comprises a mushroom shaped cap 102 external to the first spring chamber portion 62, a shaft 104 received within the port 65, and a plurality of flexible tabs 106 sloping outwardly from the shaft 104, from a point interior of the first spring chamber 62, toward the cap 102. The tabs 106 abut an interior surface 108 of the cylindrical head 48 and bias the vent cap 102 against an exterior surface 110 of the cylindrical head 48.

The vent 100 thus prevents air and contaminants in the atmosphere from entering the first spring chamber portion 62 through the port 65. One or more concentric rings 112 on the cap 102 contact the exterior surface 110 of the cylindrical head 48 to enhance the seal formed between the cap 102 and the cylindrical head 48. Elevated pressure within the first spring chamber portion 62 will overcome the biasing force of the tabs 106 and vent cap 102 and allow air within the first spring chamber portion 62 to exhaust through the port 65. Preferably, the biasing force of the tabs 106 will prevent the vent 100 from opening until the pressure within the first spring chamber portion exceeds one to two psig, thereby maintaining a slight positive pressure within the first spring chamber portion 62. It will be apparent that when the volume within the first spring chamber portion 62 expands upon release of the spring 60, air flow into the chamber from atmosphere through the ports 65 will be blocked by the vents 100.

Returning to FIG. 1, air flow to the first spring chamber portion 62, in response to the extension of the spring 60, and diaphragm 52, comes through the actuator rod 56 and is controlled by a control valve 120 in the distal end 55 of the actuator rod 56. The control valve 120 controls the flow of air from the first service chamber portion 26 into the first spring chamber portion 62 in a manner to be more fully explained hereinafter.

Figure 3:
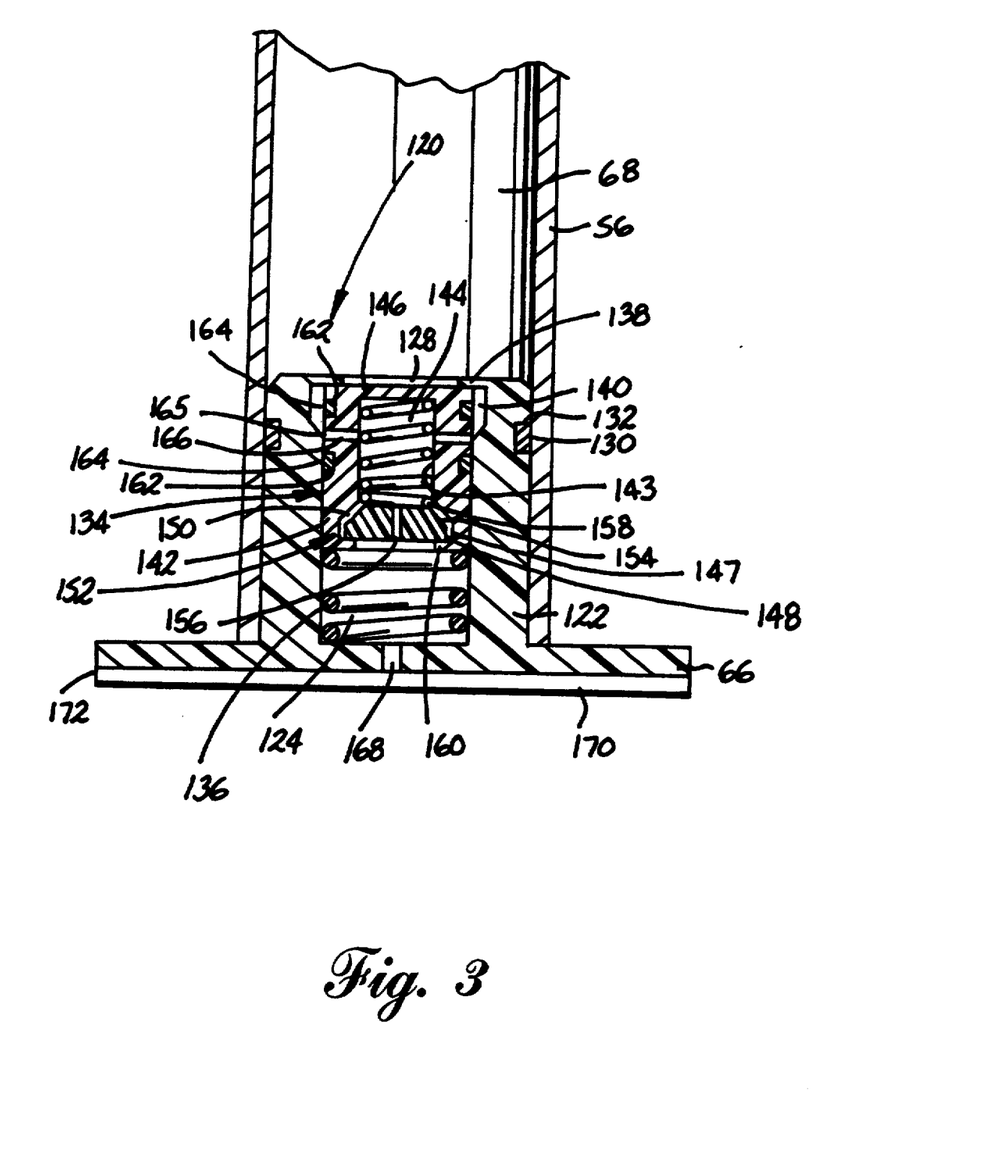
FIG. 3 is an enlarged fragmentary cross sectional view of the control valve of FIG. 1.

Turning to FIG. 3, the control valve 120 comprises a cylindrical body 122 integrally formed with the reaction plate 66, and having a cylindrical valve chamber 124 therein. The reaction plate 66 forms a closed end 126 of the valve chamber; an opposite end 128 is open. The control valve body 122 is press fit into the distal end 55 of the actuator rod 56, and is sealed thereto by an o-ring seal 130 in a circumferential groove 132 about the valve body 122.

A main piston 134 is mounted within the valve chamber 124 for axial reciprocal movement therein. A spring 136, positioned between the reaction plate 66 and the main piston 134, biases the main piston 134 away from the reaction plate 66. Outward movement of the main piston 134 is restrained by a plurality of radially inwardly directed projections 138 at the valve chamber's open end 128. An annular groove 140 is provided in the wall of the valve chamber 124 immediately adjacent the projections 138.

The main piston 134 comprises a cylindrical body 142, having a first cylindrical interior wall 143 and an end wall 146, forming a cylindrical interior chamber 144; and a second cylindrical interior wall 147 forming a larger diameter cylindrical outer chamber 148. Outer chamber 148 opens at one end to the valve chamber 124, and at an opposite end to the interior chamber 144. A conical transition wall 150 separates the first interior wall 143 and the second interior wall 147.

A discoid shaped float piston 152 is disposed within the outer chamber 148 for reciprocal movement and comprises a chamfered annular edge 154 adapted to mate with the conical transition wall 150, and a small, axially extending, central aperture 156. A spring 158, positioned between the interior chamber end wall 146 and the float piston 152 biases the float piston 152 away from the end wall 146. A plurality of axially inwardly directed projections 160 or a snap ring, or a washer restrain the outward movement of the float piston 152.

A pair of annular grooves 162 in the outer surface of the main piston body 142 retain a pair of O-ring seals 164. A plurality of passageways 166 extend radially outwardly from the interior chamber 144, through the first cylindrical wall 143, and exit the main piston body 142 at points 165 between the annular seals 164. When the main piston 134 abuts the projections 138 as shown in FIG. 3, the radial passageways 166 align with the annular groove 140, putting the central bore 68 of the actuator rod 56 into fluid communication with the interior chamber 144 of the main piston 134.

Figure 6:
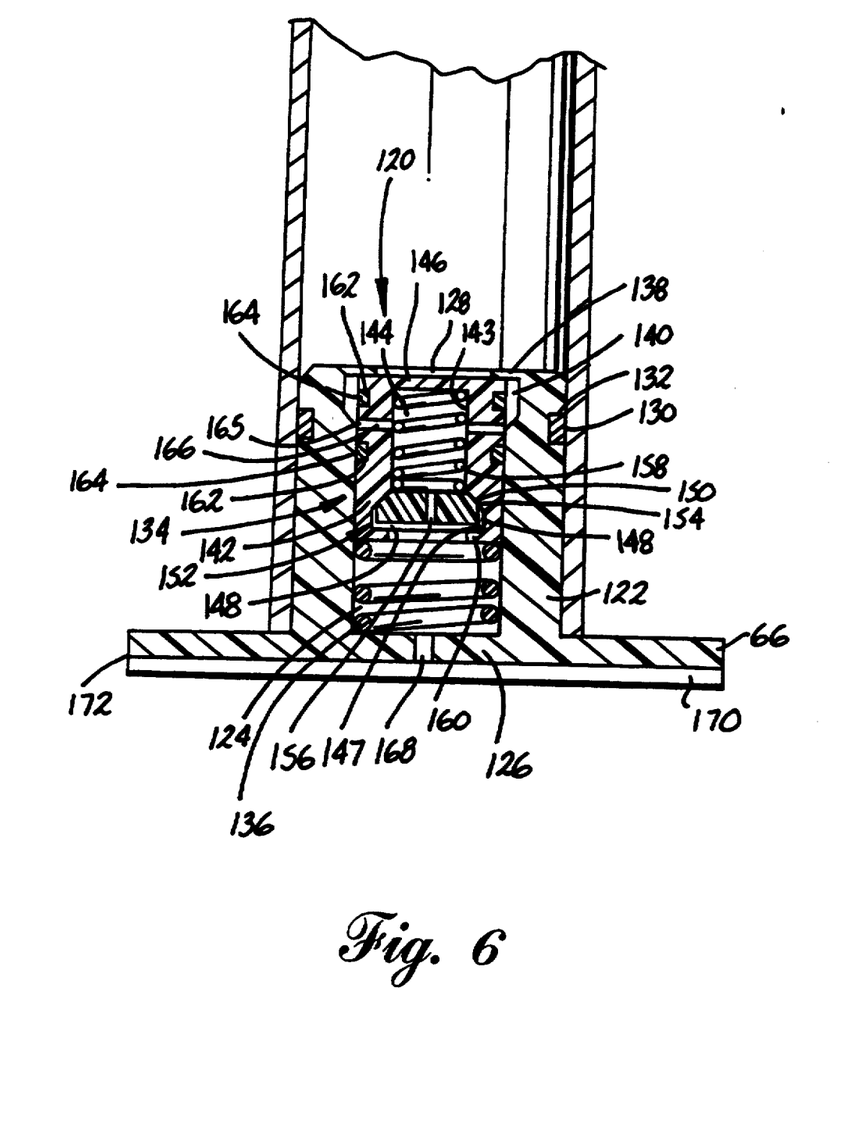
FIG. 6 is an enlarged fragmentary cross sectional view similar to FIG. 3, showing an additional operating condition of the control valve of FIG. 3.

Regardless of the position of the float piston 152 within the outer chamber 148, the interior chamber 144 communicates fluidly with the valve chamber 124, and ultimately with the first service chamber portion 26 (not shown in FIG. 3) through a central aperture 168 in the portion of the reaction plate 66 forming the valve chamber closed end 126. When the chamfered edge 154 of the float piston 152 abuts and seals against the conical transition wall 150 (see FIG. 6), fluid flow into the interior chamber 144 through the outer chamber 148 is possible only through the small aperture 156. However, when the float piston 152 abuts the inward radial projections 160 as shown in FIG. 3, flow may also pass around the float piston 152. Operation of the control valve 120, valve piston 134 and float piston 152 will be more fully described hereinafter.

Figure 4:
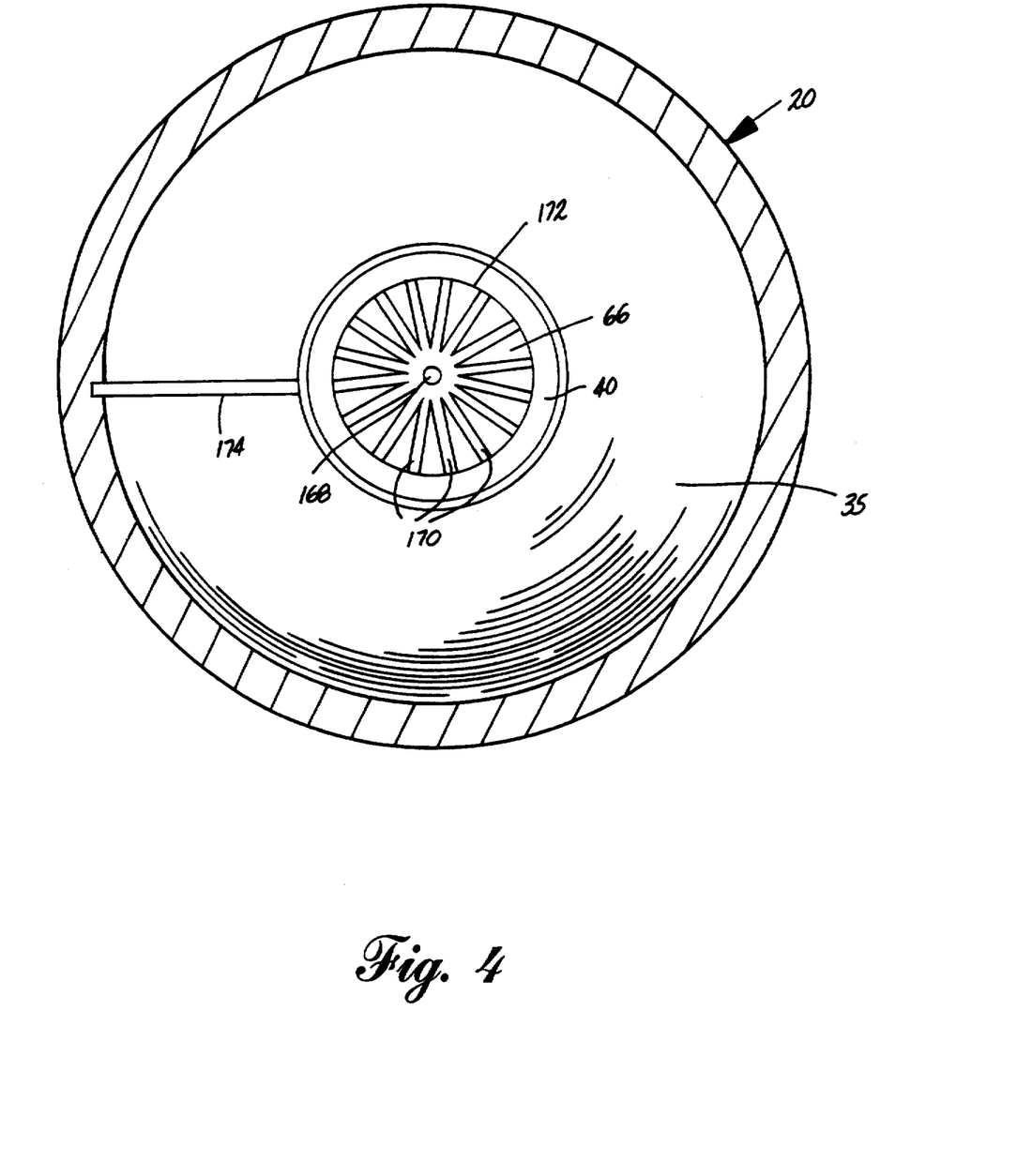
FIG. 4 is a sectional view taken along line 4—4 of FIG. 1.

Turning now to FIG. 4, a plurality of radial grooves 170 in the face of the reaction plate 66 lead from the central aperture 168 to a peripheral edge 172 thereof. A further groove 174 in the face of the wall 35, leads from the annular seat 40 in the adapter housing 20 to the air service port 42 (FIG. 1). Thus, even when the first service chamber portion is evacuated and the first elastomeric diaphragm 24 is forced against the adapter housing 20, as shown in FIG. 1, the valve chamber 124 remains in fluid communication with the air service port 42 through the grooves 170, 174.

Returning to FIG. 1, the control valve 120 controls the flow of air into the first spring chamber 62 from the air service port 42, through the central bore 68 of the actuator rod 56, and apertures 75 and 73 in the proximal end 57 of the actuator rod 56 and pressure plate 58. The control valve 120 restricts or blocks flow under some operating conditions and permits flow under other conditions.

Figure 5:
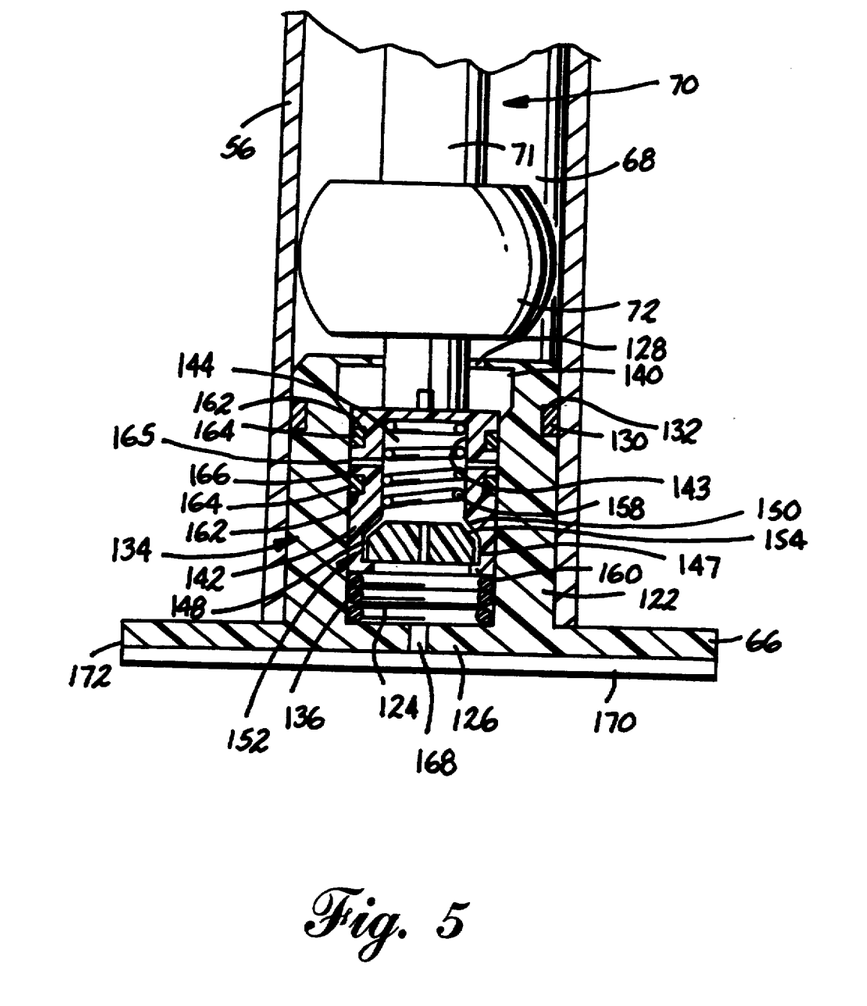
FIG. 5 is an enlarged fragmentary cross sectional view of the control valve of FIG. 3, shown in the normal operating condition.

A normal operating condition where the spring brake is not actuated is illustrated in FIG. 1 with the detail of the control valve 120 in this condition shown in FIG. 5. In this condition, the caging tool 70 is fully extended into the spring chamber 51. However, the second spring chamber portion 63 is pressurized so that the diaphragm 52 and pressure plate 58 keep the spring 60 and actuator rod 56 retracted. Selective application of pressurized air to the first service chamber 26 extends the pushrod 12 to apply the brakes (not shown) in the normal manner.

Because the spring 60 and diaphragm 52 remain retracted, the first spring chamber portion 62 is static and does not require an inflow of air through the control valve 120. Hence, the control valve 120 is in the closed position as shown in FIG. 5. An open control valve 120 would vent air every time pressurized air is introduced to the first service chamber portion 26 to apply the brakes (not shown), by exhausting air through the aperture 168, the control valve 120, the central bore 68 of the actuator rod 56, into the first spring chamber portion 62 and out to atmosphere through the vents 100.

The valve pin 74 on the caging tool 70 extends into the valve chamber open end 128, pushing the valve piston 134 toward the reaction plate 66, so that the radial passageways 166 are no longer aligned with the valve chamber annular groove 140. The radial passageways 166 abut the wall of the valve chamber 124, and the seals 164 prevent air from escaping from the piston interior chamber 144 into the upper portion of the valve chamber 124. The control valve 120 is thus closed and prevents air flow therethrough.

A second condition, when the spring brake is being applied, occurs when neither the second spring chamber portion 63, nor first service chamber portion 26 are pressurized. When pressure is lost in the second spring chamber portion 63, either due to a system failure or manual release, the spring 60 and the actuator rod 56 extend, thus moving the control valve 120 in the end of the actuator rod 56 away from the valve pin 74. This condition is illustrated in FIG. 3. Upon separation of the valve pin 74 from the end wall 146 of the control valve 120, the spring 136 pushes the valve piston 134 into abutment with the radial inward projections 138, putting the radial passageways 166 into alignment with the annular groove 140. The open control valve 120 allows air to flow from the air service port 42, through the control valve 120, through the hollow actuator rod 56 and into the expanding volume of the first spring chamber 62. The spring 158 keeps the float piston 152 in abutment with the inward projections 160, allowing air to freely flow past the float piston 152.

A third condition occurs when the service brake has been applied before activating or releasing the spring brake. In the third condition (detail illustrated in FIG. 6), pressure is lower in the first spring chamber portion 62 than the first service chamber 26 (as when the driver sets the parking brake by depressurizing the second spring chamber 63 while applying the service brake so that the first service chamber portion 26 is pressurized). The resulting pressure differential across the float piston 152 forces the chamfered edge 154 of the float piston 152 into sealing abutment with the conical transition wall 150, preventing flow around the float piston 152.

Any flow passing through the control valve 120 must pass through the small central aperture 156 in the float piston 152. The aperture 156 allows some flow to fill the expanding volume of the first spring chamber portion 62 as when the spring brake is being applied, for example, but restricts excess flow which would otherwise exhaust to atmosphere through the vents 100. Of course, when the service brake is released, thereby removing pressure from the first service chamber portion 26, and relieving the pressure differential across the float piston 152, the float piston 152 reverts to the position shown in FIG. 3.

As previously described with reference to FIG. 2, when the diaphragm 52 and spring 60 are retracted, reducing the volume of the first spring chamber portion 62, the vents 100 allow the excess air therein to exhaust to atmosphere. The one to two psig positive pressure within the first spring chamber portion 62 inhibits introduction of foreign matter from the brake actuator's service environment into the first spring chamber portion 62 through the ports 65.

Figure 7:
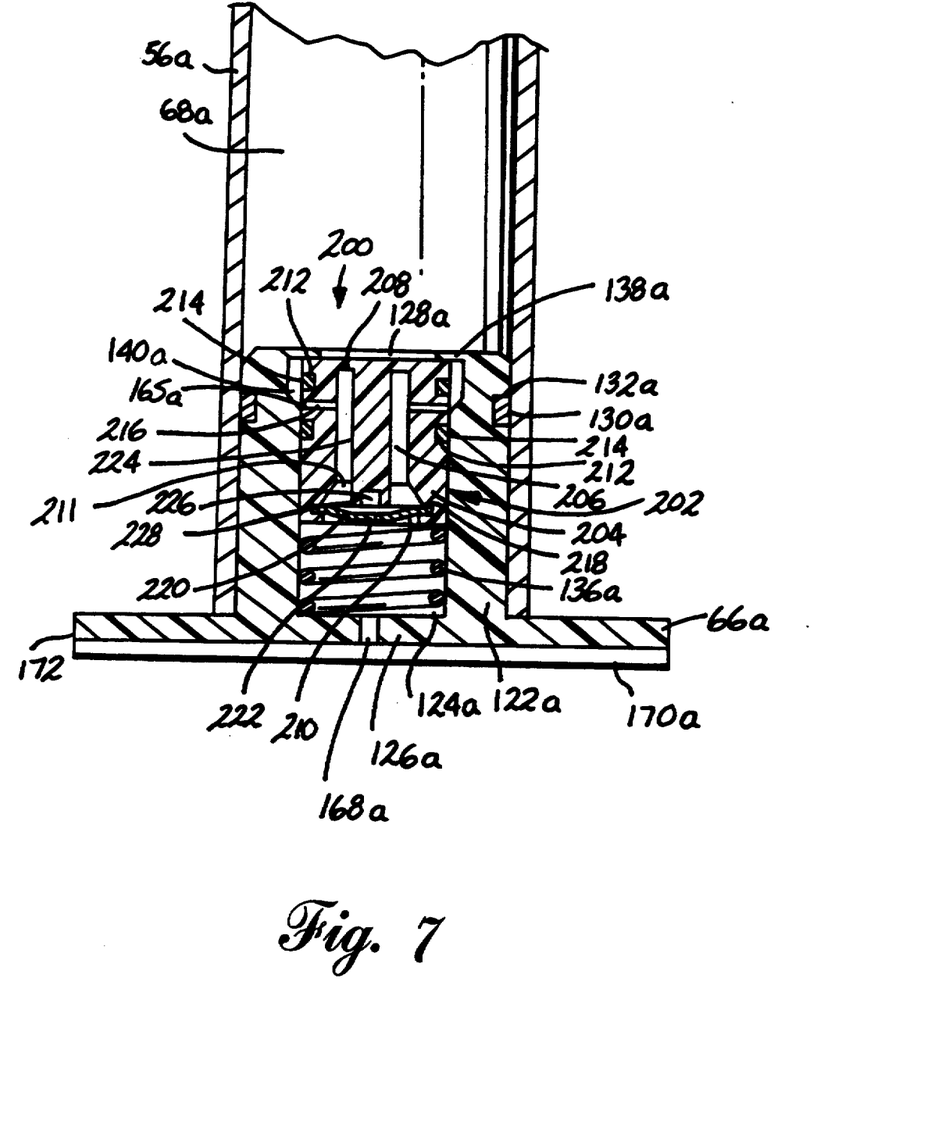
FIG. 7 is an enlarged fragmentary cross sectional view of a second embodiment of a control valve according to the invention.
Figure 8:
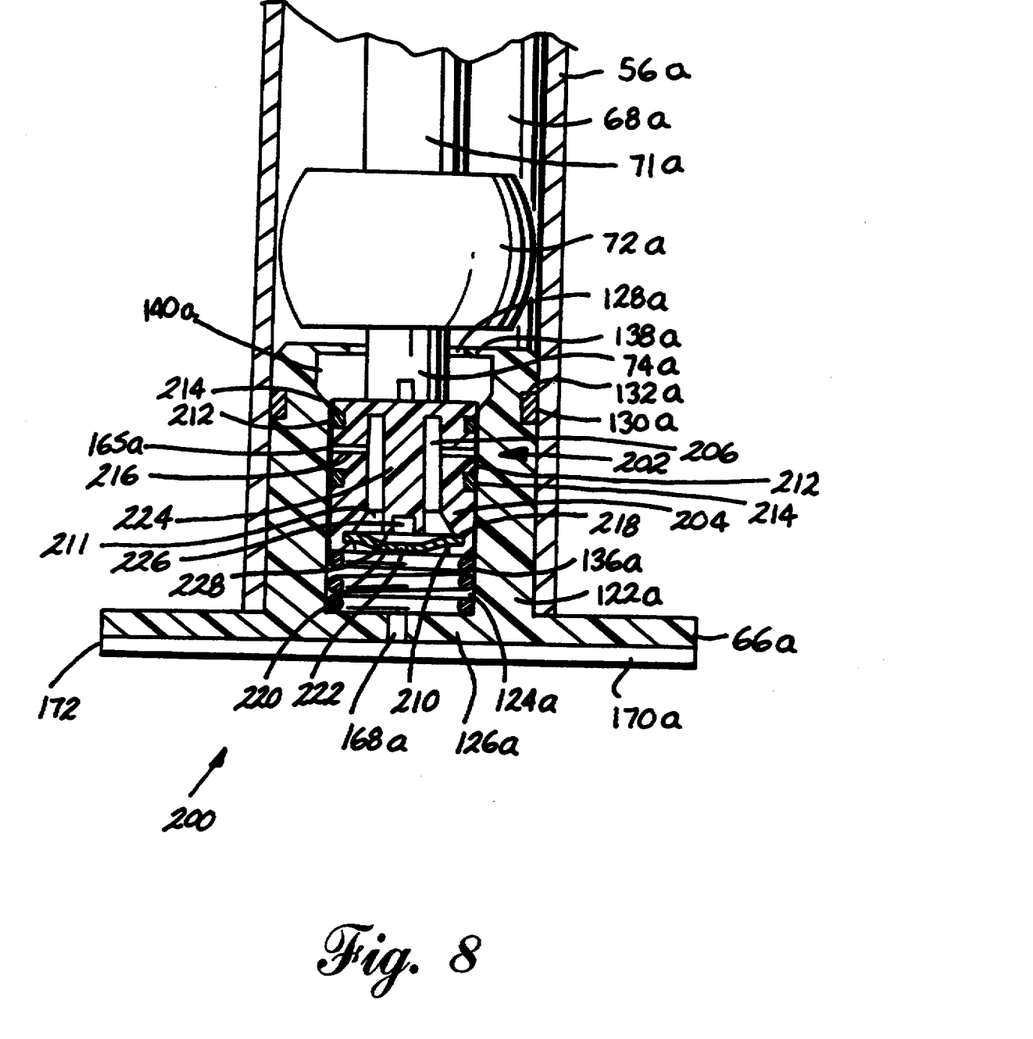
FIG. 8 is an enlarged fragmentary cross sectional view of the control valve of FIG. 7 shown in the normal operating condition.
Figure 9:
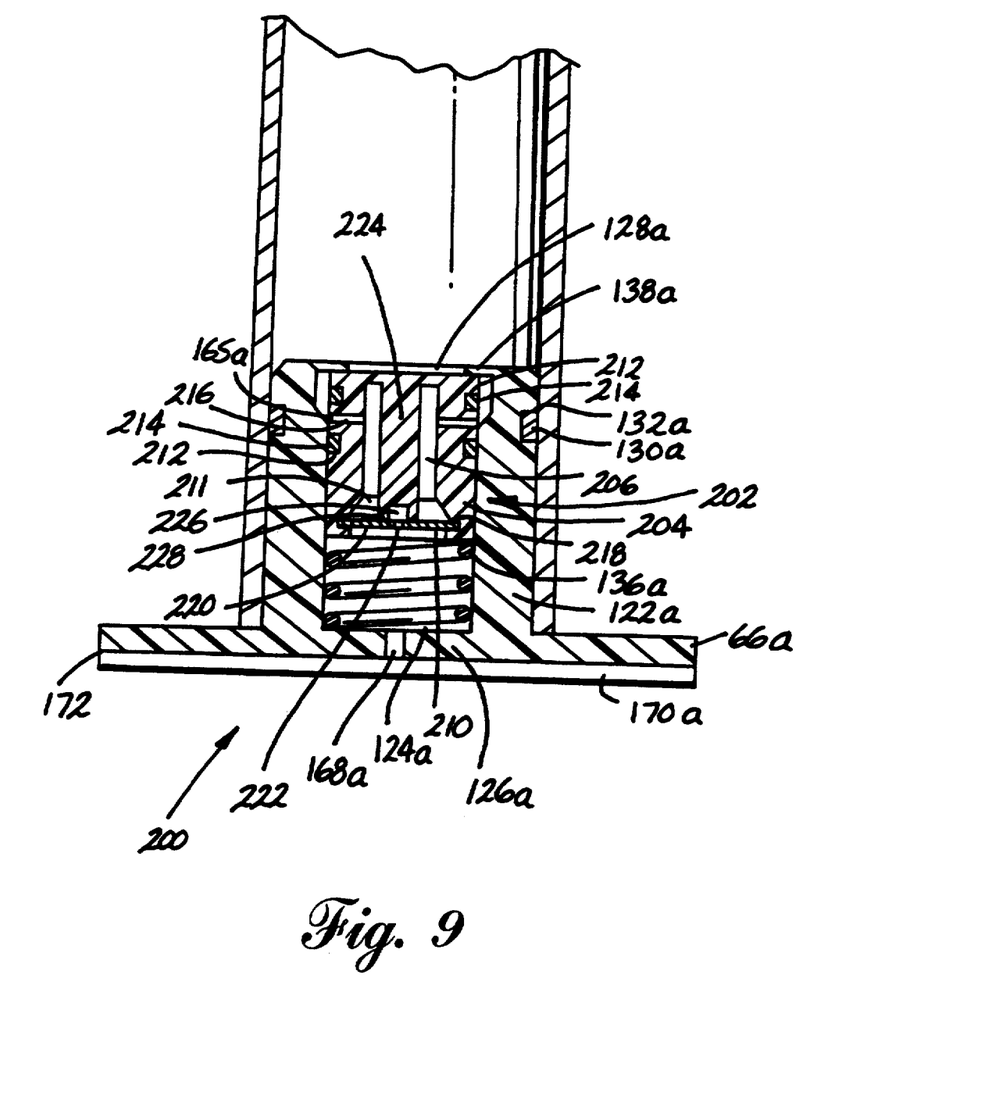
FIG. 9 is an enlarged fragmentary cross sectional view similar to FIG. 3 showing an additional operating condition of the control valve of FIG. 7.

A second embodiment of a control valve 200, according to the invention, is illustrated in FIGS. 7 to 9 where like parts are nudered with like numerals. Referring first to FIG. 7, the control valve 200 employs a valve body 122a substantially similar to the valve body 122 previously described with reference to the first embodiment control valve 120. A piston 202, received within the valve body 122a for reciprocal movement, comprises a cylindrical body 204, having a cylindrical interior chamber 206 with an end wall 208 and an open end 210, which opens into the valve chamber 124a. A short conical portion 211 of the interior chamber 206 expands outwardly toward the open end 210. A plurality of radial passageways 216 extend outwardly radially from the interior chamber 206 to exit the piston body 204 at points in alignment with the annular groove 140a when the piston 200 abuts the inward radial projections 138a. A pair of annular grooves 212 about the exterior of the piston on either side of the radial passageways 216 contain annular seals 214. The piston 200 functions similarly to the previously described first embodiment piston 134.

An annular groove 218 in the interior chamber 206 at its open end 210 retains a slightly convex spring metal diaphragm 220, having a central aperture 222. A stanchion 224 extends coaxially in the interior chamber 206 from the end wall 208 towards the metal diaphragm 220. A bore 226 extending coaxially into the free end of the stanchion 224 forms an annular, axially extending lip 228.

Referring to FIG. 1, and to each of FIGS. 7 to 9, operation of the control valve 200 in the three operating conditions of the brake actuator 10 will now be described. When the brake actuator is in the first condition (normal operation, second spring chamber portion 63 pressurized), as shown in FIG. 8, the valve pin 74a of the caging tool 70a forces the piston 202 into the valve body 122a so that the radial passageways 216 and seal 214 are inward of the annular groove 140a. In this position, the piston 202 closes the control valve 200.

When the brake actuator is in the second condition (second spring chamber portion 63, and first service chamber portion 26 both depressurized) as illustrated in FIG. 7, the piston 202 abuts the inward radial projections 138a, so that the interior chamber 206 communicates with the central bore 68a of the actuator rod 56a. The interior chamber 206 is open to the first service chamber portion 26 through the central aperture 222 of the metal diaphragm 220. The metal diaphragm 220 and stanchion 224 perform essentially the same function as the previously described float piston 152. When the brake actuator 10 is in the third condition (second spring chamber portion 63 depressurized and first service chamber portion 26 pressurized), as illustrated in FIG. 9, the pressure differential across the metal diaphragm 220 causes it to deform towards the stanchion 224, engaging the lip 228 thereon. The central aperture 222 of the metal diaphragm 220 aligns with the stanchion bore 226 so that in this position flow through the aperture 222 is greatly reduced. The spring constant of the metal diaphragm 220 is large, so that pressure differentials above approximately 35 psig in the first service chamber portion 26 will cause the metal diaphragm 220 to deform into contact with the stanchion 224.

Figure 10:
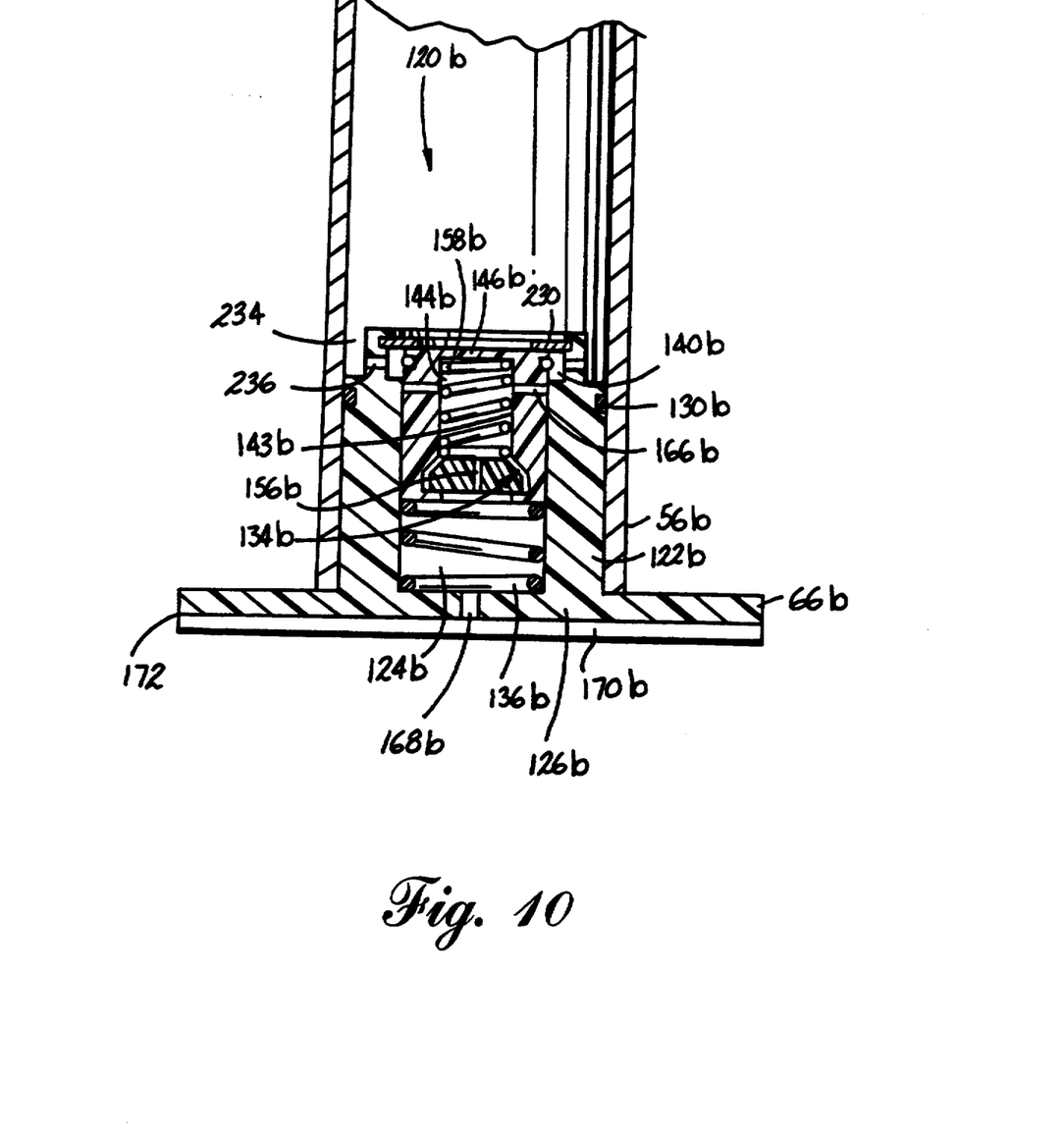
FIG. 10 is an enlarged fragmentary cross-sectional view of a third embodiment of a control valve according to the invention.

An alternative means for restraining movement of the main piston 134 or 134a is illustrated in FIG. 10, where like parts are numbered with like numerals. The inwardly directed radial projections 138 or 138a of the first and second embodiments are replaced by a snap ring 300. The snap ring 300 is received within an annular snap ring groove 302 in the annular groove 140b, and projects inwardly radially from the snap ring groove 302 a sufficient distance to abut the end wall 146b of the main piston 134b. When the main piston 134b abuts the snap ring 300, the interior chamber 144b communicates with the annular groove 140b through the radial passageways 166b. An annular groove 304 encircles the exterior of the control valve body 122b, at its uppermost edge. The annular groove 140b remains in constant fluid communication with the central bore 68b of the actuator rod 56b through a plurality of axial passageways 306 leading from the annular groove 140b to the annular groove 304.

Preferably, the valve body 122, reaction plate 66, the main pistons 134, 202, and the float piston 152 are formed of plastic.

Reasonable variation and modification are possible within the scope of the foregoing disclosure without departing from the spirit of the invention which is defined in the accompanying claims. For instance, the invention is not limited to the flexible plugs 100 described herein, and other means may be provided which pass air from the first spring chamber 62 to atmosphere and block air flow from the operating environment into the first spring chamber, such as a flap valve.

Also, alternate means can be provided in place of the control valves 120 and 200 disclosed herein for preventing flow through the actuator rod 56 when it is in its retracted position. For instance, the actuator rod 56 can be made to seal against the end of the head 48 when the actuator rod 56 is retracted, or the distal end 55 of the actuator rod 56 can be formed with a narrower diameter receiver which receives the head portion 72 of the caging tool 70, so that the head portion 72 effectively seals the actuator rod 56. The invention has been described with reference to a diaphragm style spring brake actuator for illustration purposes only, and it would applicable to piston style brake actuators as well.

The embodiments for which an exclusive property or privilege is claimed are defined as follows:

1. In a brake actuator for a vehicle comprising:
   a service brake actuator housing and a spring brake actuator housing each having an interior space;
   a first movable seal disposed within the spring brake actuator housing dividing the interior space thereof into a first spring brake actuator chamber and a second spring brake actuator chamber;
   a second movable seal disposed within the service brake actuator housing dividing the interior space thereof into a first service brake actuator chamber and a second service brake actuator chamber; and
   an actuator rod operably connected to the first movable seal and movable therewith for reciprocation between a first position wherein the actuator rod is essentially within the interior space of the spring brake actuator housing and a second position wherein the actuator rod extends into the interior space of the service brake actuator housing;
   the improvement comprising:
   an aperture through the spring brake actuator housing at the first spring brake chamber and a one-way check valve at the aperture whereby the check valve allows fluid flow out of the first spring brake chamber and prevents fluid flow into the first spring brake chamber through the aperture;
   the actuator rod having a passageway extending therethrough wherein the first spring brake actuator chamber is in communication with the second spring brake actuator chamber through the actuator rod; and
   a first valve at the actuator rod passageway adapted to establish flow of fluid through the passageway only when the actuator rod moves from the first position toward the second position.

2. A brake actuator according to claim 1 wherein the first moveable seal comprises a diaphragm.

3. A brake actuator according to claim 2 wherein the first valve has an open mode wherein the first valve allows fluid flow through the passageway, a closed mode wherein the first valve inhibits fluid flow through the passageway, and a control means for placing the first valve into the closed mode when the actuator rod is in the first position and for placing the first valve into the open mode when the actuator rod is away from the first position.

4. A brake actuator according to claim 3 wherein the control means comprises a bore wall defining a valve bore in the first valve, a piston slidable within the valve bore, a channel through the piston and an abutting surface connected to the spring brake housing wherein the abutting surface abuts the piston and pushes the piston inwardly of the valve bore when the actuator rod is in the first position whereby the bore wall blocks the channel.

5. In a brake actuator for a vehicle, comprising:
a service brake housing having an interior space;
a tandem spring brake housing having an interior space;
a first movable sealing member, disposed within the service brake housing, dividing the interior space thereof into a first service brake chamber and a second service brake chamber;
a second movable sealing member, disposed within the spring brake housing, dividing the interior thereof into a first spring brake chamber and a second spring brake chamber;
a power spring disposed in the first spring brake chamber between the spring brake housing and the second sealing member, the power spring biasing the second sealing member toward the service brake housing; and
a hollow actuator rod having a distal end and a proximal end, the proximal end extending through the second sealing member for reciprocal movement therewith between an extended position and a retracted position, and the distal end disposed within the first service brake chamber;
the improvement comprising:
the spring brake housing comprising a wall having an exterior surface exposed to atmosphere, an interior surface exposed to the first spring brake chamber, and an aperture therethrough;
a one-way check valve mounted to the wall at the aperture to permit fluid to flow from the first spring brake chamber to atmosphere only when fluid pressure in said first spring brake chamber exceeds a predetermined value;
the actuator rod being open at its proximal and distal ends wherein the first spring brake chamber is in fluid communication with the first service brake chamber through the actuator rod;
a control valve mounted to the actuator rod for controlling fluid flow through the actuator rod and having an open mode wherein the first spring brake chamber is in open communication with the first service brake chamber, and a closed mode wherein the flow of fluid between the first spring brake chamber and the first service brake chamber is closed; and
a valve actuator operatively connected to the control valve for placing the control valve in the closed mode when the actuator rod is in the retracted position and for placing the control valve in the open mode as the actuator rod moves from the retracted position toward the extended position.
whereby fluid is delivered to the first spring brake chamber from the first service brake chamber upon movement of the actuator rod toward the extended position.

6. A brake actuator according to claim 5, wherein the check valve comprises a plug having a shaft disposed within the aperture, a head on the shaft larger than the aperture and exterior of the spring brake housing, and biasing means connected to the plug for biasing the head into sealing abutment with the exterior surface when fluid pressure within the first spring brake chamber is less than the predetermined value.

7. A brake actuator according to claim 6, wherein the shaft extends into the first spring broke chamber and the biasing means comprises at least one flexible projection extending from the shaft toward and deformably abutting the interior surface of the spring brake housing wherein the deformation of the projection urges the head of the plug into sealing abutment with the spring brake housing.

8. A brake actuator according to claim 6, wherein the predetermined pressure is two pounds per square inch of gauge pressure.

9. A brake actuator according to claim 6 wherein the head has an annular ring which contacts the spring brake housing to form a seal.

10. A brake actuator according to claim 5 wherein the control valve is mounted within the distal end of the actuator rod.

11. A brake actuator according to claim 10 and further comprising a caging tool extending into the actuator rod through its proximal end, and wherein the valve actuator comprises an end of the caging tool adapted to engage a portion of the control valve when the actuator rod is in the retracted position.

12. A brake actuator, according claim 5 wherein the spring brake housing further comprises:
a wall having an exterior surface exposed to atmosphere, an interior surface exposed to the first spring brake chamber, and an aperture therethrough; and
a one-way check valve mounted to the wall at the aperture to permit fluid to flow from the first spring brake chamber to atmosphere only when fluid pressure in said first spring brake chamber exceeds a predetermined value.

13. A brake actuator according to claim 12, wherein the main piston has a sealing lip at the distal end of the interior bore, and further comprising an overpressure stop valve comprising:
a sealing element moveable within the piston chamber between an open position and a restricted position; and
a spring biasing the sealing element toward the open position;
wherein the sealing element abuts the sealing lip to restrict flow through the interior bore in the restricted position, and the sealing element is spaced from the sealing lip in the open position.

14. A brake actuator according to claim 13 wherein the sealing element comprises a float piston, the spring is mounted between the float piston and the closed proximal end of the interior bore, and the sealing lip comprises an annular shoulder.

15. A brake actuator according to claim 14 wherein the float piston has a small coaxial aperture therethrough.

16. A brake actuator according to claim 14 wherein a stanchion extends coaxially from the proximal end within the interior bore, and the sealing element comprises a spring diaphragm having a flow aperture therethrough, the diaphragm having a resting shape wherein the diaphragm flow aperture is away from the stanchion and deformable under a predetermined pressure gradient across the diaphragm wherein the diaphragm contacts the stanchion so that fluid flow through the diaphragm flow aperture is blocked by the stanchion.

17. A brake actuator according to claim 5 wherein the actuator rod has an exterior face at its distal end with at least one groove extending radially outwardly from the opening at the actuator rod distal end to a radial edge thereof; and the first service brake chamber has an air port adapted to be connected to a source of pressurized air and a channel in the service brake housing leading from the air port to the at least one groove, whereby the opening at the distal end of the actuator rod remains in communication with the air port when the first moveable member is in contact with portions of the spring brake housing between the opening at the distal end of the actuator rod and the air port.

* * * * *